Figure 1:
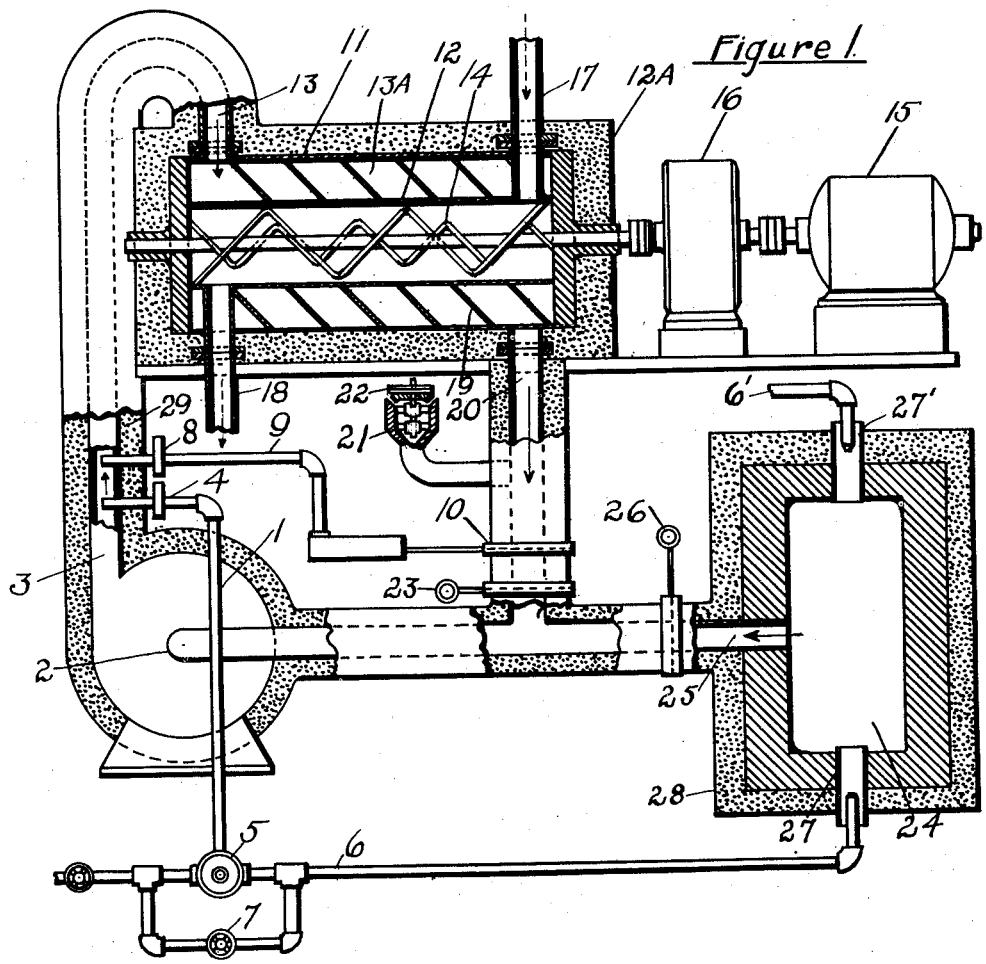
Figure 2:
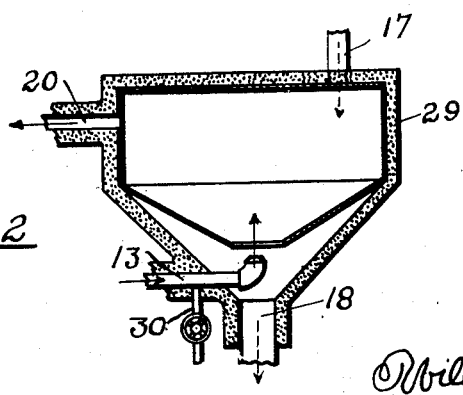
Figure 3:
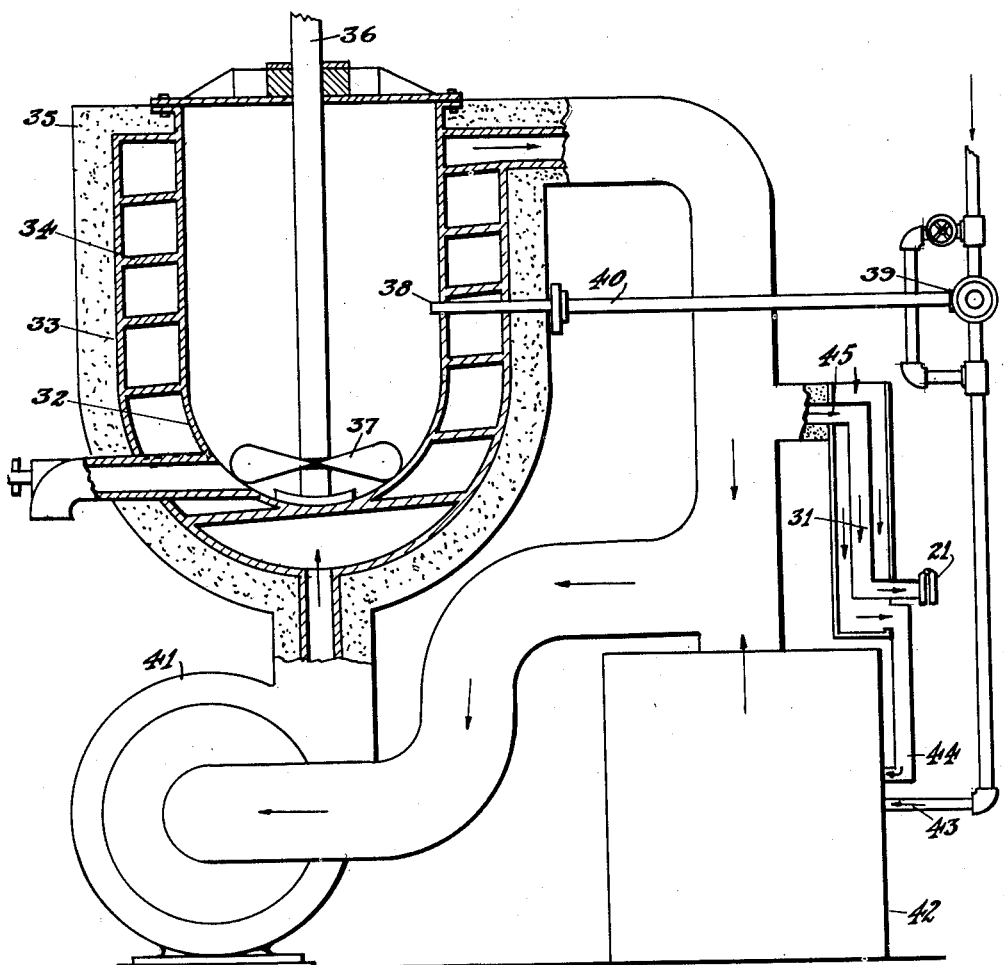
Figure 4:
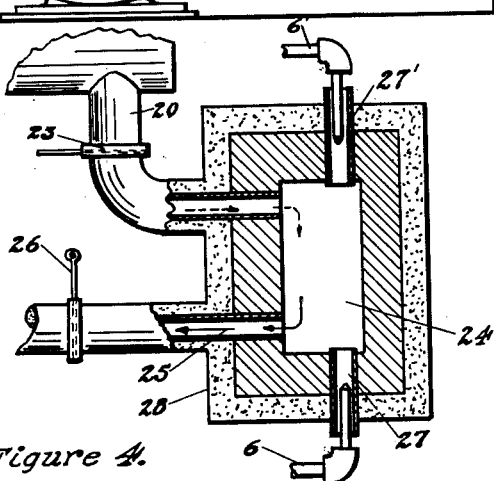

Oct. 30, 1928.

W. A. DARRAH 1,689,379

APPARATUS FOR HEAT APPLICATION

Filed Dec. 29, 1924   2 Sheets-Sheet 1

William A. Darrah
Inventor.

Patented Oct. 30, 1928.

1,689,379

UNITED STATES PATENT OFFICE.

WILLIAM A. DARRAH, OF CHICAGO, ILLINOIS.

APPARATUS FOR HEAT APPLICATION.

Application filed December 29, 1924. Serial No. 758,705.

This invention relates to methods and apparatus for applying, transferring, utilizing and controlling heat for carrying out various industrial processes.

This application is a continuation in part of my application Serial #641,160, filed May 24, 1923.

The object of the invention is to provide a simple, efficient, economical equipment and method for accomplishing the results referred to above.

A specific application of the process and apparatus which forms the basis of this invention, consists in the manufacture of dextrine from starch. It should be understood, however, that this particular application is only one of a very great number, and will be chosen in this specification as a specific means of describing one form of equipment and process.

In general, it may be stated that wherever it is desirable to utilize heat in an industrial process, some form of the equipment or process which forms the basis of this invention may be utilized. For example, it is common today to use various forms of steam jackets, circulating oil systems, hot water systems, etc., for applying heat in such processes as cooking various materials, vulcanizing, and in the manufacture of various articles of food, soap, chemical products, etc.

Many modifications of the apparatus and process shown and described will be apparent to those skilled in the art.

Referring to the drawing, Figure I shows schematically and partly in section, one form of my invention as applied to the manufacture of dextrine. It will be obvious that in place of the dextrinizer shown, a great many other applications may be made, with minor changes, without departing from the spirit of this invention.

Figure II shows schematically a slightly modified means of applying heat.

Figure III shows schematically a slightly modified form of this device, in which the heat is applied to an upright kettle, such as a varnish kettle or candy kettle. The controlling thermostat is inserted into the interior of the kettle and a heat interchanger is provided around the exhaust outlet.

Figure IV shows an alternative arrangement in which the return circulating gas passes through the combustion chamber as will be later described.

Referring to Figures I, (1) indicates a blower having an intake (2) and outlet (3). The blower may be of any suitable type, depending upon the temperatures of operation and the pressures required. Ordinarily a vane type of blower, with provision for cooling the bearings, is desirable.

A thermostat (4) is placed in the discharge line (3) of blower (1), the control of said thermostat (4) being arranged to open or close pilot valve (5) on gas main (6) which correspondingly increases or decreases the heat produced by the gas burner, thus controlling the temperature of the circulating air.

(7) Represents a valve arranged to bypass the thermostatically controlled valve (5).

An additional thermostat (8) is placed in the discharge line (3), the control tube (9) from thermostat (8) serving to operate thermostatically controlled gate valve (10), as will be later described.

Discharge line (3) from blower (1) enters shell (11) of the heat using equipment (12) by connection (13).

In the case at hand, the heat using equipment (12A) is shown to consist of the shell (12) within which a double screw (14) is caused to rotate by motor (15) operating through gear reduction (16). Material is fed into the heat using device by inlet tube (17), while outlet tube (18) serves to discharge the said material.

For purposes of illustration, the heat utilizing equipment is one of the commercial forms used for forming dextrine from starch, but it should be understood that this particular device may be used for any other purpose, and also that the device shown is merely for purposes of illustration, as the same method and equipment for applying heat may be used in a great many other cases.

Baffles (19) are disposed in the shell (11) around heat using device (12) in such a manner that the heated air entering at (13) circulates helically around device (12) and through (13A). After circulating through space or chamber (13A) the heated air leaves by tube (20) which contains a relief valve (21) having variable damper control (22) which is shown here as a variable weight but which may obviously consist of springs, or any other desired mechanism. Discharge tube (20) is also provided with a thermostatically controlled blast gate (10), the purpose of which will be later described. The combustion chamber or heater (24) is connected through pipe (25) containing blast gate (26), to return air tube (2) of the blower. Combustion chamber (24) is provided with burners (27) and (27¹), which are supplied with fuel (gas, oil, powdered coal, etc.) through pipes (6) and (6¹) controlled by valves as for example valve (5) in pipe (6) as previously discussed. Combustion chamber (24) is provided with an insulating layer (28), and in the same way, the blower tube, heat utilizing device, and other equipment, are provided with heat insulating layer (29).

In operation the blower (1) is started in motion, being driven by a motor, engine, or other suitable source of power, which is not shown and which forms no part of this invention. The air from blower (1) circulates helically through space or chamber (13A), and the main portion of it returns to blower (1) through tube (20) and intake (2) as shown. Thermostat (4) maintains burner (27) in operation at such times as the temperature of the air circulating around device (12) and through (13A) is too low for satisfactory operation. It will be obvious that thermostats (4) or (8), either or both, may be placed in tube (20) instead of tube (3) as shown. The products of combustion from burner (27), which are formed in combustion chamber (24), are drawn into intake tube (2) by the suction of blower (1). The relative amount of combustion gases which is drawn into blower (1) is determined in part by a blast gate (23) and in part by blast gate (10). In starting the device in operation, blast gate (10) should be open and blast gate (23) should be partly closed, until the desired pressure builds up in tube (20), which would cause relief valve (21) to open, thus allowing a portion of the circulating gases to escape, the escaping portion being made approximately equal to the volume of the products of combustion drawn into the system from combustion chamber (24). When thus adjusted it will be apparent that the system will circulate approximately a given volume of gases, automatically exhausting or rejecting a sufficient amount to compensate for the new products of combustion which are used to maintain the temperature constant.

It will also be apparent that by making thermostat (8) operate on the inverse principle, that is, causing thermostat (8) to close blast gate (10) when the temperature becomes too low, automatic provision will be made for exhausting a greater portion of the circulating gases and thus compensating for the new combustion gases which are added.

It will be apparent that blast gate (23) provides hand operated means for throttling the gases returning from the container to be heated to the intake of the blower and thus blast gate (23) provides manually operated means of accomplishing the results obtained by thermostatically controlled valve (10).

It will be apparent also that by partially closing either hand operated valve (23) or thermostatically operated valve (10) the return of circulating gases through tube (20) to the intake of blower (2) will be impeded and this will result in an increase of pressure in tube (20) thus causing a greater volume of exhaust gases to pass out of relief valve (21). It will, therefore, be understood that the degree of opening of either valve (23) or valve (10) may affect the operation of relief valve (21).

In operating equipment of the class described, I have found that gas, oil, or powdered coal may be used to advantage as the combustible material to produce heat in combustion chamber (24). Natural gas or city gas is the simplest and easiest material to control and has many operating advantages but of course involves a higher cost. Fuel oil, however, is an economical, inexpensive fuel in many localities, and gives excellent results.

It will be apparent that inasmuch as the products of combustion are taken bodily into the circulating gases, that the efficiency of heat transfer is extremely high, the only losses aside from radiation being those due to rejected gases which pass out through relief valve (21). It is entirely feasible to enclose relief valve (21) in a heat interchanger shown by numeral (31), and the air which is used for combustion purposes in chamber (24) may be heated by the heat interchanger (31) thus giving extremely high efficiencies.

The above arrangement is shown diagrammatically in Figure III, in which (32) represents the container to be heated, (33) the surrounding shell provided with helical flues (34), and covered with insulation (35). (36) indicates the shaft of the agitating mechanism (37). (38) indicates the end of the thermocouple which operates the thermostatic valve (39) through control tube (40). (41) indicates the blower and (42) indicates the combustion chamber.

The circulating system is substantially the same in Figure III as in Figure I. (43) indicates the fuel supply line to combustion chamber (42), while (44) indicates the air supply line. The exhaust outlet (45) from the circulating system carries the discarded products of combustion to relief valve (21) through heat interchanger (31). Air used for combustion purposes in combustion chamber (42) travels in the direction shown by the arrows through heat interchanger (31) and pipe (44) into combustion chamber (42), thus conserving some of the heat which would otherwise be lost. The arrows shown on the pipes through which the circulating gases travel, indicate the direction of motion of these gases. It will be noted that the thermostat (38) in this case is controlled by the temperature of the material being heated instead of by the temperature of the circulating gases. If desired I may surround the portion of thermostatic tube (40) which passes through the flues (34) surrounding container (32) with insulation in order to make it independent of the temperature in the flue space (34) surrounding container (32). This is unnecessary in many cases, however, as the tip (38) of thermostat (40) is the sensitive portion and this is shown within container (32) and, therefore, in contact with the material being treated. The arrangement described above would make the operation of the thermostat substantially independent of the temperature of the gases in the surrounding shell. I do not restrict myself to this construction exclusively, however.

Another advantage of this system is the close control which is obtainable due partly to the relatively low heat capacity of the circulating medium (air or other gases) and partly to the high velocity with which they travel.

It should be understood that while air is referred to in a general way as the circulating medium, any desired circulating medium may be used, which as steam (water vapor), nitrogen, carbon dioxide, or mixtures of various gases. In general, however, air will be found to be most practical and is very effective.

The relative velocity and temperature of the circulating medium will of course be different for various conditions. In general it is desirable to have a velocity in the neighborhood of 1000 ft. per minute over the surface to be heated. Velocities higher than this are desirable and effective but frequently involve too much resistance to the flow of air. The difference in temperature between the incoming and outgoing air will depend upon the materials to be treated, their temperature, their heat conductivity, and other factors. In many operations, such as the manufacture of dextrine, a total temperature difference of less than 10 degrees between the incoming and outgoing air is often obtained.

It will be apparent from the above, that in addition to providing an extremely economical and efficient means of heat transfer, the method and equipment here described allows a close and accurate control, and permits operation at practically any desired temperature. It will be apparent in the case of systems which utilize steam under high pressure, that to secure temperatures in the neighborhood of 500 degrees F. will involve extremely high pressures which are uneconomical and hazardous. In the same way, oil is definitely limited by its upper safe operating temperature. Circulating water is of course much more limited than either steam or oil, and less effective. In the case of my equipment, however, I can without difficulty secure and maintain temperatures ranging from slightly over 100 degrees F. to considerably in excess of 1000 degrees F., with equal facility. At the upper ranges of temperatures it is frequently advisable to utilize non-oxidizing materials, but aside from this feature the rest of the equipment would be unchanged. Temperatures from 400 to 700 degrees F. are easy to obtain and hold using my equipment.

Another modification of this invention, which will be apparent from the description given herein, consists in placing either thermostat, or both, within the space or chamber in contact with the material to be heated, so that the temperature of the circulating gases will be controlled directly by the temperature of the material being heated. This arrangement is shown diagrammatically in Fig. III where the thermostat (38) is shown with the active or sensitive tip in contact with the interior of the container (32) and, therefore, in contact with the material therein. If desired I may surround the portion of thermocouple (40) with insulation for the distance that it extends through the gas passage surrounding container (32), thus making its operation substantially independent of the temperature of the gases in the surrounding shell. Obviously, the result here obtained will be substantially similar to the result secured when the thermostat is placed in the air circulating line, providing proper compensation is made for the temperature drop through the shell and other parts of the apparatus.

The modification shown in Figure II. provides by pipe (30) for the introduction of steam or other vapors into the circulating heated air or gases which in this case come in direct contact with the material to be heated.

In constructing the heat application device which forms the subject of this invention, it is convenient to place combustion chamber (24) as close as possible to pipe (2) in order that the hot gases may enter the circulating system as directly as possible. In order to prevent undue suction on combustion chamber (24), thus introducing possibilities of drawing in an excess of cold air or of impairing combustion, it is of advantage to provide blast gate (26) controlling flow of gases between chamber (24) and intake (2). By throttling down blast gate (26) the resistance to the passage of gases from combustion chamber (24) to conduit (2) is increased. This results in re-circulating a greater portion of gases returned from pipe (20), therefore reducing the suction on combustion chamber (24).

When a substantially constant operating condition is secured after the apparatus is first erected, it is of course not necessary to make continuous adjustments to blast gate (26).

In constructing the equipment which forms the subject of this invention, I find it advantageous to construct combustion chamber (24) so as to have a relatively large volume, thus acting in a measure as a reservoir or storage space for the hot gases of combustion. A construction of this kind permits more uniform operating conditions than if the thermostat (4) which controls the combustion at burner (27) is relied on exclusively.

I do not wish to limit myself to the exact arrangements of pipe and apparatus shown on the drawings, as obviously many changes may be made in this equipment and still come within the scope of this invention. Thus bringing the return pipe (20) into combustion chamber (24) as shown in Figure IV would not depart from the spirit of my invention.

Having now fully described my invention, what I claim as new and wish to secure by Letters Patent in the United States is as follows:

1. An apparatus for applying heat, comprising a combustion chamber, a blower, a device to be heated, a connection between said blower and said device, an outlet connection between said device and said blower, a relief opening in said outlet connection, a connection between said combustion chamber and said outlet connection, a means for supplying fuel to said combustion chamber, and a thermostatic means controlling said fuel supplying means.

2. An apparatus for applying heat, comprising a combustion chamber, a blower, a device to be heated, a connection between said blower and said device, an outlet connection between said device and said blower, a relief opening in said outlet connection, a connection between said combustion chamber and said outlet connection, a means for supplying fuel to said combustion chamber, and a thermostatically operated device located in said device to be heated, and controlling said fuel supplying means.

3. An apparatus for supplying heat under controlled conditions consisting of a blower, a chamber to be heated, an inlet to said chamber connected to said blower, an outlet from said chamber, a conduit connecting said outlet and the inlet of said blower, a combustion chamber communicating with said conduit, a burner for supplying heat to said combustion chamber, and a thermostatic means controlling said burner.

4. An apparatus for applying heat under controlled conditions, consisting of a combustion chamber, a blower, a chamber to be heated, an inlet to said chamber to be heated, connected to said blower, an outlet from said chamber to be heated, a conduit connecting said outlet and the inlet of said blower, and a conduit connecting said combustion chamber to said blower inlet.

5. The combination of claim 4 with means for supplying fuel to said combustion chamber and thermostatic means controlling said fuel supply means.

6. The apparatus of claim 4 with fuel supply means for said combustion chamber and a thermostatically operated device in said chamber to be heated, and controlling said fuel supply means.

7. An apparatus for applying heat, comprising a combustion chamber, a blower, an enclosure to be heated, a connection between the blower and said enclosure, an outlet connection between said enclosure and the inlet of said blower, a connection from said combustion chamber to said outlet connection, and a thermostatic means for controlling the volume of gases passing to the inlet of said blower.

8. An apparatus for applying heat, comprising a combustion chamber, a blower, a chamber to be heated, a connection between the blower and said chamber, an outlet connection from said chamber to be heated communicating with said combustion chamber, a connection between said combustion chamber and the inlet of said blower and a thermostatically controlled means for regulating the flow of gases to said blower.

WILLIAM A. DARRAH.